United States Patent
Sailappan et al.

(10) Patent No.: US 10,757,088 B2
(45) Date of Patent: *Aug. 25, 2020

(54) YARN REST API PROTECTION

(71) Applicant: BlueTalon, Inc., Redwood City, CA (US)

(72) Inventors: Sridhar Shanmugam Sailappan, Cupertino, CA (US); Dilli Dorai Minnal Arumugam, Campbell, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/410,873

(22) Filed: May 13, 2019

(65) Prior Publication Data

US 2019/0268324 A1 Aug. 29, 2019

Related U.S. Application Data

(63) Continuation of application No. 15/486,259, filed on Apr. 12, 2017, now Pat. No. 10,291,602.

(51) Int. Cl.
*H04L 29/06* (2006.01)
*H04L 29/08* (2006.01)
*H04L 12/911* (2013.01)

(52) U.S. Cl.
CPC .......... *H04L 63/08* (2013.01); *H04L 47/82* (2013.01); *H04L 63/0281* (2013.01); *H04L 63/10* (2013.01); *H04L 63/205* (2013.01); *H04L 67/28* (2013.01)

(58) Field of Classification Search
CPC ..... H04L 63/08; H04L 47/82; H04L 63/0281; H04L 63/10; H04L 63/205; H04L 67/28
See application file for complete search history.

(56) References Cited

U.S. PATENT DOCUMENTS

| | | | |
|---|---|---|---|
| 6,006,018 A * | 12/1999 | Burnett | G06F 21/6236 709/200 |
| 6,870,842 B1 * | 3/2005 | Caronni | H04L 12/18 370/390 |
| 7,231,517 B1 * | 6/2007 | Mashayekhi | H04L 63/045 709/229 |

(Continued)

*Primary Examiner* — Ghodrat Jamshidi
(74) *Attorney, Agent, or Firm* — Fiala & Weaver P.L.L.C.

(57) ABSTRACT

Systems, computer program products and methods implementing YARN service protection are described. A reverse proxy in a cluster of computers in a distributed computing system can intercept a request to access a YARN service. The request can be associated with requester credentials. The reverse proxy determines that the request includes a REST API call. The reverse proxy determines, based on authentication configuration information, that the call needs to be authenticated. The reverse proxy authenticates the call based on the requester credentials using an authentication mechanism specified in the configuration information. Upon successful authentication of the call, the reverse proxy makes authorization checks based on specified configuration information. If the authorization checks pass, the reverse proxy forwards the request to a server that provides the YARN service in the cluster. If the authentication or authorization checks fail, the reverse proxy denies the request.

20 Claims, 3 Drawing Sheets

(56) References Cited

U.S. PATENT DOCUMENTS

| | | | | |
|---|---|---|---|---|
| 8,353,052 | B2* | 1/2013 | Larsson | H04L 63/0807 |
| | | | | 726/29 |
| 10,069,914 | B1* | 9/2018 | Smith | H04L 63/0428 |
| 10,339,332 | B1* | 7/2019 | Bendory | G06F 8/60 |
| 10,360,367 | B1* | 7/2019 | Mossoba | G06Q 20/40 |
| 2006/0041507 | A1* | 2/2006 | Novack | G06F 21/31 |
| | | | | 705/50 |
| 2006/0235850 | A1* | 10/2006 | Hazelwood | H04L 61/1523 |
| 2007/0240202 | A1* | 10/2007 | Sullivan | H04L 12/14 |
| | | | | 726/4 |
| 2012/0042085 | A1* | 2/2012 | Boeszoermenyi | H04L 63/029 |
| | | | | 709/228 |
| 2013/0019291 | A1* | 1/2013 | Zou | H04L 63/08 |
| | | | | 726/6 |
| 2015/0088978 | A1* | 3/2015 | Motukuru | H04L 67/148 |
| | | | | 709/203 |
| 2015/0304908 | A1* | 10/2015 | Yu | H04W 48/17 |
| | | | | 370/331 |
| 2016/0014155 | A1* | 1/2016 | Brucker | H04L 63/20 |
| | | | | 726/1 |
| 2016/0036855 | A1* | 2/2016 | Gangadharappa | H04L 63/20 |
| | | | | 726/1 |
| 2017/0111336 | A1* | 4/2017 | Davis | H04L 63/08 |

* cited by examiner

YARN REST API PROTECTION

CROSS-REFERENCE TO RELATED APPLICATIONS

This application is a continuation application of and claims priority to U.S. application Ser. No. 15/486,259, filed on Apr. 12, 2017.

TECHNICAL FIELD

This application relates to computer system security techniques for distributed computing systems.

BACKGROUND

A distributed computing system can provide various services such as distributed data processing services, distributed file storage services, distributed database services, or distributed messaging services. An example of a distributed computing system is an Apache® Hadoop® based system that includes one or more clusters. An Apache Hadoop cluster, or simply, a Hadoop cluster, includes one or more computers designated as nodes. Various tools can be implemented to manage nodes and resources in a Hadoop cluster. YARN (Yet Another Resource Negotiator) is an example tool that manages a cluster. A YARN resource manager can be accessed through a Representational State Transfer (REST) application programming interface (API), e.g., through an HTTP (Hypertext Transfer Protocol) or HTTPS (HTTP Secure) request. Through the YARN REST API, a client device can manage a Hadoop cluster, including, for example, get cluster information, obtain resources in the cluster, retrieve application objects, and so on.

SUMMARY

In general, this specification relates to computer system security techniques.

Systems, computer program products and methods implementing YARN service protection are described. A reverse proxy in a cluster of computers in a distributed computing system can intercept a request to access a YARN service. The request can be protected with requester credentials. The reverse proxy determines that the request is a REST API call. The reverse proxy determines, based on authentication configuration information, that the call needs to be authenticated. The reverse proxy authenticates the call based on the requester credentials using an authentication mechanism specified in the configuration information. Upon successful authentication of the call, the reverse proxy performs an authorization check. If the authorization check passes, then the reverse proxy forwards the request to a server that provides the YARN service in the cluster. If the authentication fails, the reverse proxy blocks to call.

Particular embodiments of the subject matter described in this specification can be implemented to realize, but are not limited to, one or more of the following example advantages. The disclosed techniques improve upon conventional YARN API call handling by providing an additional layer of protection for the YARN resource manager, e.g., YARN Resource Manager REST endpoints. The disclosed techniques can provide to an administrator the ability to control which endpoints will be exposed to the remote nodes or clients. The disclosed techniques allow the administrator to select various authentication methods, within or beyond a Hadoop cluster. Accordingly, compared to conventional YARN API call handling, the disclosed techniques provide more flexibility and security that is better tailored to needs of the system or of an administrator.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

Like reference numbers and designations in the various drawings indicate like elements.

DETAILED DESCRIPTION

Figure 1:
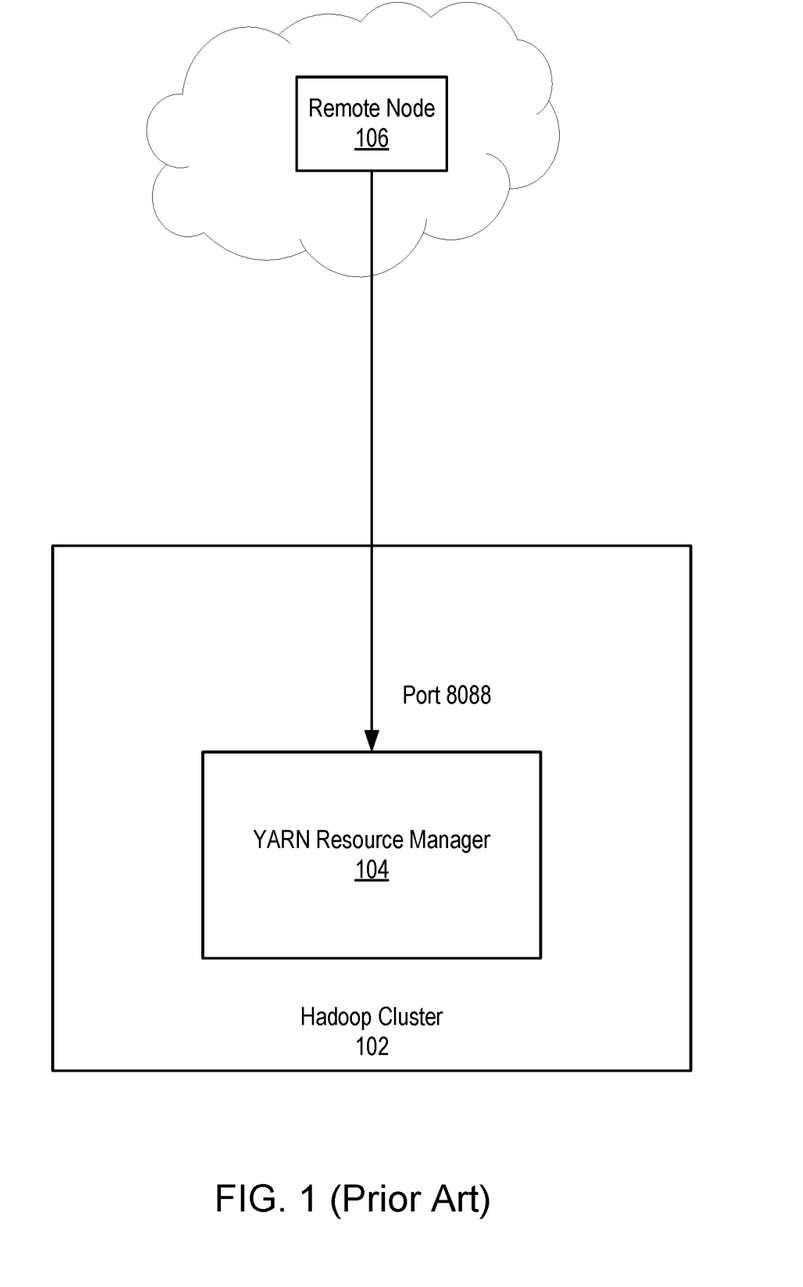
FIG. 1 is a block diagram illustrating a conventional architecture for accessing a YARN resource manager.

FIG. 1 is a block diagram illustrating a conventional architecture for accessing a YARN resource manager. A Hadoop cluster 102 includes a cluster of computers configured to provide various cloud-computing and cloud-storage services. The one or more computers can perform parallel computing operations in a distributed computing environment. The cluster of computers can be designated as nodes. The nodes can include one or more name nodes, which are masters, and one or data nodes, which are slaves. The name nodes and data nodes performs computing using various cluster resources including, for example, memory, disk storage space, CPU time, and/or network bandwidth.

A YARN resource manager 104 manages the cluster resources. The YARN resource manager 104 executes on a master node and provisions the cluster resources to the data nodes. The YARN resource manager 104 can be accessed through REST APIs. The REST APIs can include a set of uniform resource identifier (URI) resources that provide information on the cluster, including, for example, cluster health, data node status, applications running on a cluster, etc. The REST APIs can include a set of URI resources for configuring the allocation of the cluster resources.

A remote node 106, e.g., a client device, can access the YARN resource manager 104 through the REST API using one or more HTTP or HTTPS calls. The HTTP or HTTPS calls can have methods including, for example, GET, POST and PUT. An example URI for obtaining an application identifier that can be used to submit applications is provided below in Listing 1.

http://<YARN http address:port>/ws/v1/cluster/apps/new-application (1)

The host portion of the URI of Listing 1 "YARN http address" specifies an address, e.g., an IP (Internet Protocol) address, of the YARN resource manager 104. The port portion of the URI of Listing 1 specifies a port number, e.g., 8088, that the YARN resource manager 104 operates. The path in the URI, e.g., "ws/v1/cluster/apps/new-application," specifies a particular function of the YARN REST API.

Figure 2:
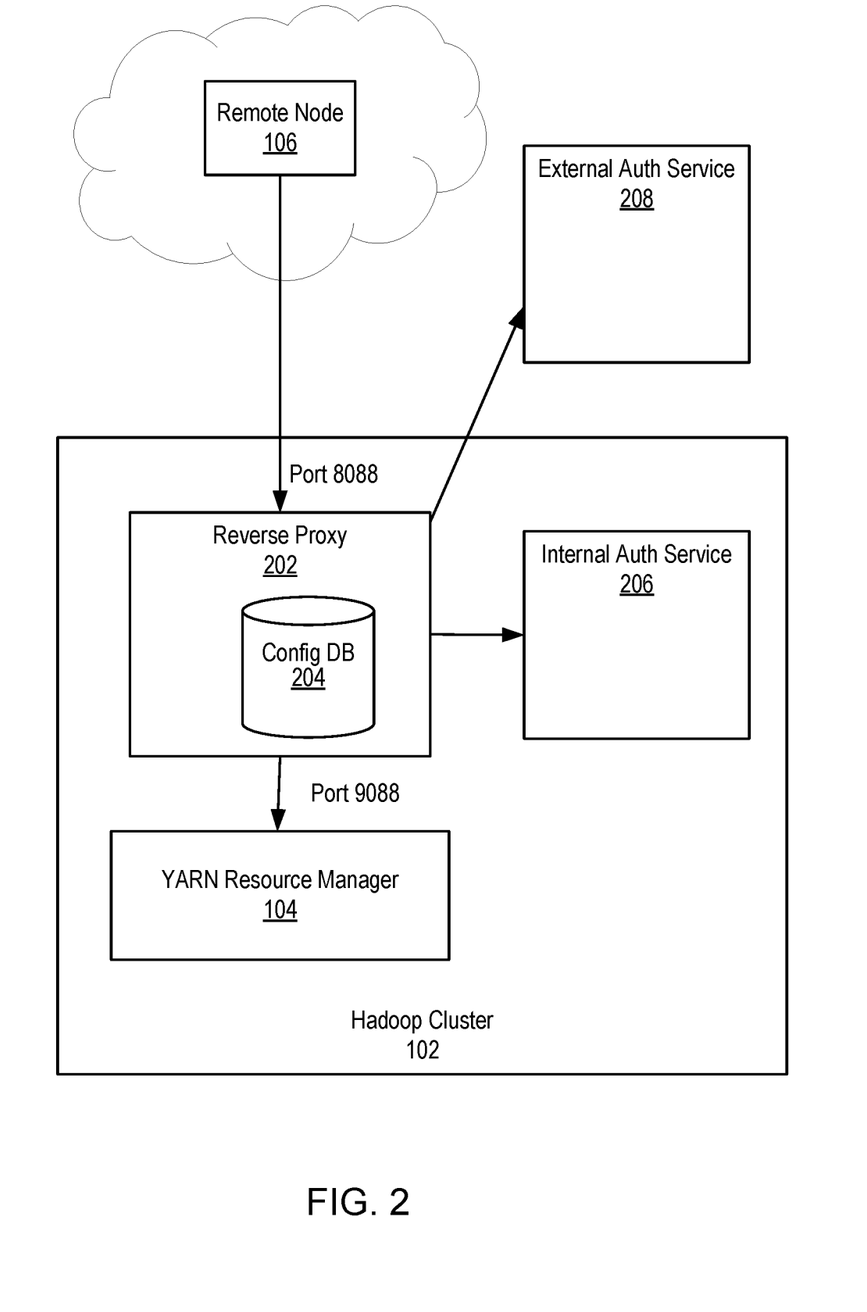
FIG. 2 is a block diagram illustrating an example architecture for accessing a YARN resource manager through a reverse proxy.

FIG. 2 is a block diagram illustrating an example architecture for accessing a YARN resource manager through a reverse proxy. A remote node 106 makes a call to the Hadoop cluster 102. The call can include an HTTP or HTTPS call to a URI, e.g., the URI of Listing (1). In the Hadoop cluster 102, a reverse proxy 202 intercepts the call.

The reverse proxy 202 includes a node configured to retrieve resources on behalf of the YARN resource manager 104. The reverse proxy 202 returns the resources to the remote node 106 as if the resources are provided by the YARN resource manager 104.

204 can be a configuration file, e.g., an XML document, a JSON document, or a database table, that stores administrator-editable configuration information on which call is protected. Contents of an example configuration file of the configuration database 204 is shown below in Table 1.

TABLE 1

Example Configuration File Content

| Property | Description | Default Value |
| --- | --- | --- |
| yarn.proxy.reverseproxyuri | URI of the reverse proxy | http://[1st IP address]:[1st port number] |
| yarn.proxy.targeturi | URI of the YARN Resource Manager | http://[2nd IP address]:[2nd port number] |
| yarn.proxy.blockapi.newapp | Block API access for POST /ws/v1/cluster/apps/newapplication | [true]\|[false] |
| yarn.proxy.blockapi.submitapp | Block API access for POST /ws/v1/cluster/apps | [true]\|[false] |
| yarn.proxy.blockapi.appstate | Block API access for PUT /ws/v1/cluster/apps/{appid}/state | [true]\|[false] |
| yarn.proxy.blockapi.appqueue | Block API access for PUT /ws/v1/cluster/apps/{appid}/queue | [true]\|[false] |
| yarn.proxy.blockapi.delegationtoken.create | Block API access for POST /ws/v1/cluster/delegation-token | [true]\|[false] |

The reverse proxy 202 is logically positioned in front of the YARN resource manager 104 and runs at a first port, e.g., the port 8088, that provides the resource manager service. The YARN resource manager 104, e.g., a YARN ResourceManager, is configured to run services at a second port, e.g., port 9088. The reverse proxy 202 will serve requests from the remote node 106 on behalf of the YARN resource manager 104. All requests from the remote node 106 and from other clients are routed via the reverse proxy 202. Access to the second port, where the YARN resource manager 104 now runs services, is blocked from the remote node 106 with network firewall settings, e.g., by using iptables. The reverse proxy 202 thus intercepts all REST API requests from the remote node 106.

The reverse proxy 202 has an address and port that correspond to the address and port of the original YARN resource manager. The reverse proxy 202 has an address "YARN http address" above in Listing (1). The reverse proxy 202 has an open port number that corresponds to the "port" parameter in the URI in Listing (1). Upon receiving the HTTP or HTTPS call, the reverse proxy 202 determines whether the call is a YARN REST API call. The reverse proxy 202 can determine whether call is a YARN REST API call by performing a lookup using the path in a table listing all REST API calls provided by the YARN REST API.

Upon determining that the HTTP or HTTPS call is a YARN REST API call, the reverse proxy 202 can determine whether that call is a protected call. In some implementation, the reverse proxy 202 determine whether the call is a protected call by inspecting the method of the HTTP or HTTPS call. For example, the reverse proxy can forward all the GET requests to the YARN resource manager 104. For the POST, PUT and DELETE APIs, the reverse proxy 202 controls whether the requests are forwarded or not based on the configuration in a configuration database 204.

The reverse proxy 202 then determines whether the HTTP or HTTPS call is a protected YARN REST API call by determining whether that call is specified in the configuration database 204 as requiring authentication and authorization by the reverse proxy 202. The configuration database The configuration file has three logical columns. The first column specifies properties of the reverse proxy 202. The properties can include a "reverseproxyuri" property specifying URI of the reverse proxy 202, e.g., a URI having a first IP address and a first port. The properties can include a "targeturi" property specifying URI of the YARN resource manager, e.g., a URI having a second IP address and a second port. The properties can include one or more "blockapi" properties each specifying a respective YARN REST API call to block. Each "blockapi" property can be associated with a particular YARN REST API call, e.g., appstate, and a value, e.g., true or false, that indicates whether the reverse proxy 202 shall block the corresponding YARN REST API call to authenticate a caller.

In response to determining that the HTTP or HTTPS call from the remote node 106 is not one of the YARN REST API calls specified in the configuration database 204, that the HTTP or HTTPS call has a GET method, or the call from the remote node 106 is specified in the configuration database 204 but the block setting is false, the reverse proxy 202 lets the call pass through.

In response to determining that the HTTP or HTTPS call from the remote node 106 is one of the YARN REST API calls specified in the configuration database 204, and the block setting is true, the reverse proxy 202 blocks the request. If the reverse proxy 202 blocks a certain request, e.g., a POST YARN Job, then the reverse proxy 202 provides an indicator to the remote node 106 e.g., a HTTP "Forbidden" Status code 403, to indicate that the YARN resource manager 104 refuses to take further actions on the request.

The reverse proxy 202 can authenticate the call in various ways. For example, the reverse proxy 202 can authenticate the call using HTTP basic access authentication. The HTTP basic access authentication can be backed by various authentication techniques. The reverse proxy 202 can authenticate the call using an internal authentication service 206 within the Hadoop cluster 102 or an external authentication service 208 outside of Hadoop cluster 102. The configuration database 204 can store specifications on what authentication service to use using an authentication service parameter. In some implementations, the configuration database 204 can specify that different remote nodes, e.g., groups of remote nodes having different IP address, use respective different authentication services.

Figure 3:
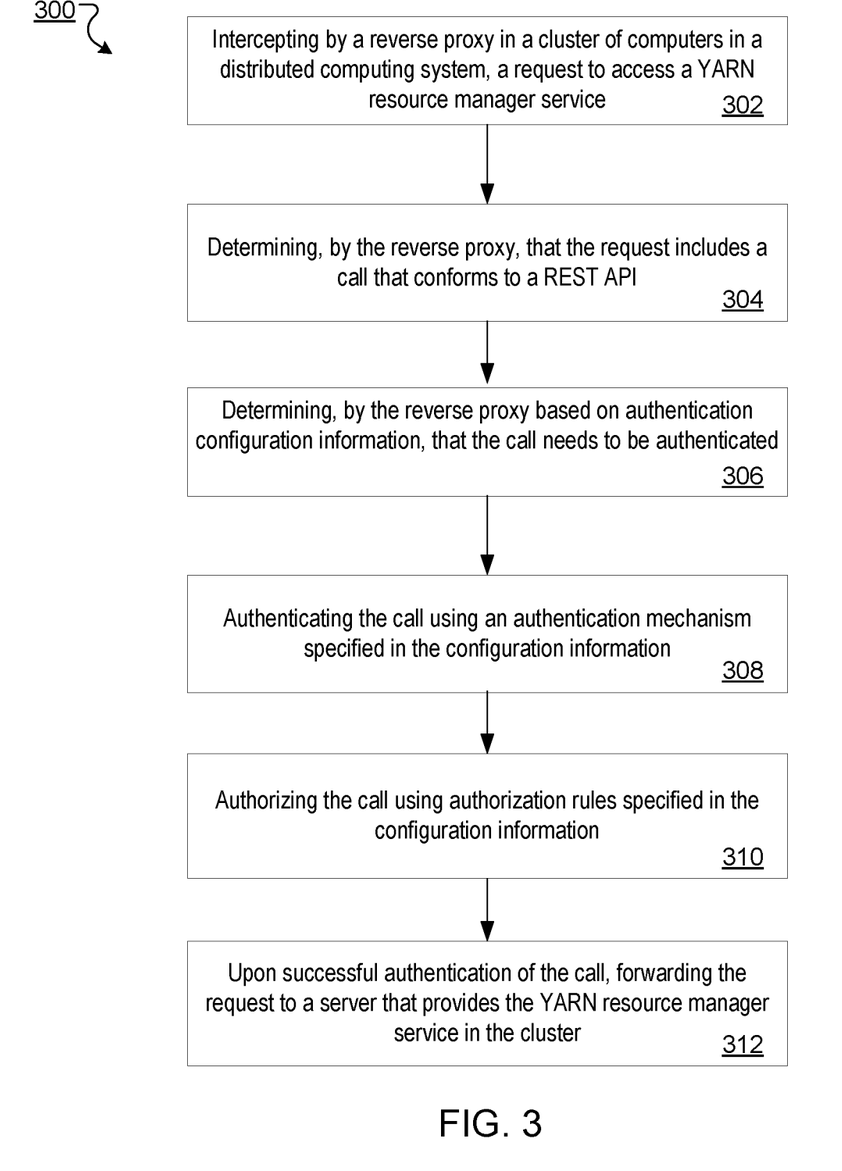
FIG. 3 is a flowchart of an example process of YARN REST API protection.

FIG. 3 is a flowchart of an example process 300 of YARN REST API protection. The process 300 can be performed by a reverse proxy that includes a system of one or more processors, e.g., the reverse proxy 202 in the Hadoop cluster 102 of FIG. 2.

The reverse proxy intercepts (302) a request to access a resource manager service. The resource manager service can be a YARN resource manager service, or another resource manager service providing URI resources for managing a distributed computing system through one or more ports. The request can be from a remote node. The request can include a request to access a server providing the YARN resource manager service. The request can be an HTTP or HTTPS request include a URI having a published address of the server as a host and a published port of the server. The reverse proxy runs at the published address and port of the server, and the actual address and port of the server are blocked from external access.

The reverse proxy determines (304) that the request is a REST API call. The reverse proxy can make the determination based on a path and optionally, a query string in the URI. The reverse proxy can determine a method of the request, e.g., GET, POST, or PUT. The reverse proxy can pass GET requests through to the server, and process POST and PUT requests by performing a lookup using the path and query in the URI in the configuration information.

The reverse proxy determines (306) based on authentication configuration information, whether the call needs to be authenticated. The authentication configuration information can include an address and port of a server providing the YARN resource manager service and an address and port of the reverse proxy. The authentication configuration information can be stored in a configuration file of the reverse proxy or a database table. The configuration file or database table has a first logical column listing YARN REST API calls and a second logical column storing a respective flag indicating whether each YARN REST API call requires authentication.

Assuming that the reverse proxy determines that the call needs to be authenticated, the reverse proxy attempts to authenticate (308) the call using an authentication mechanism specified in the authentication configuration information. Authenticating the call can include submitting a representation of caller credentials associated with the call by the reverse proxy to a user authentication service and receiving a response indicating that the caller credentials are authenticated by the user authentication service.

Upon successful authentication, the reverse proxy checks (310) if the call is authorized using rules specified in the configuration information. Upon unsuccessful authentication of the call, the reverse proxy blocks the request and/or provides an indicator to the client device that submitted the request. to indicate that the YARN resource manager 104 refuses to take further actions on the request.

Upon successful authorization of the call, or if the reverse proxy determines that the call does not need to be authenticated, the reverse proxy forwards (312) the request to a server that provides the YARN resource manager service in the cluster. The reverse proxy can receive, from the server providing the YARN service, a response to the request. The reverse proxy can filter the response based on the authentication and authorization configuration information, including blocking at least a portion of content in the response based on one or more parameters in the configuration information. The reverse proxy can forward the response to a client device that submitted the request.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   intercepting, by a reverse proxy in a Hadoop cluster of computers in a distributed computing system, a request to access a resource manager of the distributed computing system;
   determining, by the reverse proxy based on authentication configuration information, whether a call included in the request needs to be authenticated, wherein the authentication configuration information includes a list of methods that need to be authenticated and determining whether the call needs to be authenticated comprises determining whether the call includes one or more particular methods that are included in the list of methods of the authentication configuration information; and in response to determining that the call needs to be authenticated:
  authenticating the call using an authentication mechanism specified in the authentication configuration information, and
  upon successful authentication of the call, forwarding the request from the reverse proxy to a server that provides the resource manager,
wherein the reverse proxy includes one or more computer processors, and
wherein the server that provides the resource manager is different from the one or more computer processors of the reverse proxy.

2. The method of claim 1, further comprising:
determining, from a configuration database, a particular authentication service capable of authenticating the call according to the authentication mechanism, the configuration database storing information of one or more authentication services capable of performing respective authentication mechanisms, the configuration database being part of the Hadoop cluster; and
using the particular authentication service to authenticate the call.

3. The method of claim 1, wherein the call is authenticated by using an authentication service external to the Hadoop cluster.

4. The method of claim 1, wherein the authentication configuration information is stored in a configuration file or a database table, and the resource manager service is a YARN (Yet Another Resource Negotiator) resource manager service.

5. The method of claim 1, wherein authenticating the call comprises submitting a representation of caller credentials associated with the call by the reverse proxy to a user authentication service and receiving a response indicating that the caller credentials are authenticated by the user authentication service.

6. The method of claim 1, comprising:
receiving, by the reverse proxy from the server providing the resource manager service, a response to the request;
filtering the response based on an authorization configuration information, including blocking at least a portion of content in the response based on one or more parameters in the authorization configuration information; and
forwarding the filtered response by the reverse proxy to a client device that submitted the request.

7. The method of claim 6, wherein the request is an HTTP (hypertext transfer protocol) request and the response is a JSON (JavaScript Object Notation) object or an XML (Extensible Markup Language) document.

8. The method of claim 1, wherein the authentication configuration information includes an address and port of the server and an address and port of the reverse proxy.

9. A distributed computing system comprising:
a server that provides a resource manager of the distributed computing system; and
a reverse proxy in a Hadoop cluster of computers, the reverse proxy comprising
  a processor, and
  a non-transitory computer-readable medium coupled to the processor and having instructions stored thereon, which when executed by the processor, cause the processor to perform operations comprising:
    intercepting a request to access the resource manager;
    determining, based on authentication configuration information, whether a call included in the request needs to be authenticated, wherein the authentication configuration information includes a list of methods that need to be authenticated and determining whether the call needs to be authenticated comprises determining whether the call includes one or more particular methods that are included in the list of methods of the authentication configuration information, and
    in response to determining that the call needs to be authenticated:
      requesting an authentication of the call using an authentication mechanism specified in the authentication configuration information, and
      upon successful authentication of the call, forwarding the request the server that provides the resource manager,
wherein the server that provides the resource manager is different from the one processors of the reverse proxy.

10. The distributed computing system of claim 9, further comprising:
a configuration database in the Hadoop cluster, the configuration database storing information of one or more authentication services capable of performing respective authentication mechanisms,
wherein the operations further comprise
  receiving, from the configuration database, information of a particular authentication service capable of authenticating the call according to the authentication mechanism, and
  using the particular authentication service to authenticate the call.

11. The distributed computing system of claim 9, wherein the call is authenticated by an authentication service external to the Hadoop cluster.

12. The distributed computing system of claim 9, wherein the authentication configuration information is stored in a configuration file or a database table, and the resource manager service is a YARN (Yet Another Resource Negotiator) resource manager service.

13. The distributed computing system of claim 9, wherein requesting an authentication of the call comprises submitting a representation of caller credentials associated with the call to a user authentication service and receiving a response indicating that the caller credentials are authenticated by the user authentication service.

14. The distributed computing system of claim 9, wherein the operations further comprise:
receiving, from the server providing the resource manager service, a response to the request;
filtering the response based on an authorization configuration information, including blocking at least a portion of content in the response based on one or more parameters in the authorization configuration information; and
forwarding the filtered response to a client device that submitted the request.

15. A non-transitory computer-readable medium having instructions stored thereon, which when executed by a processor, cause the processor to perform operations comprising:
intercepting, by a reverse proxy in a Hadoop cluster of computers in a distributed computing system, a request to access a resource manager of the distributed computing system;

determining, by the reverse proxy based on authentication configuration information, whether a call included in the request needs to be authenticated, wherein the authentication configuration information includes a list of methods that need to be authenticated and determining whether the call needs to be authenticated comprises determining whether the call includes one or more particular methods that are included in the list of methods of the authentication configuration information; and in response to determining that the call needs to be authenticated:

authenticating the call using an authentication mechanism specified in the authentication configuration information, and     upon successful authentication of the call, forwarding the request from the reverse proxy to a server that provides the resource manager, wherein the reverse proxy includes one or more computer processors, and wherein the server that provides the resource manager is different from the one or more computer processors of the reverse proxy.

16. The non-transitory computer-readable medium of claim 15, wherein the operations further comprise:

determining, from a configuration database, a particular authentication service capable of authenticating the call according to the authentication mechanism, the configuration database storing information of one or more authentication services capable of performing respective authentication mechanisms, the configuration database being part of the Hadoop cluster; and using the particular authentication service to authenticate the call.

17. The non-transitory computer-readable medium of claim 15, wherein the authentication configuration information is stored in a configuration file or a database table, and the resource manager service is a YARN (Yet Another Resource Negotiator) resource manager service.

18. The non-transitory computer-readable medium of claim 15, wherein authenticating the call comprises submitting a representation of caller credentials associated with the call by the reverse proxy to a user authentication service and receiving a response indicating that the caller credentials are authenticated by the user authentication service.

19. The non-transitory computer-readable medium of claim 15, wherein the operations further comprise:

receiving, by the reverse proxy from the server providing the resource manager service, a response to the request;

filtering the response based on an authorization configuration information, including blocking at least a portion of content in the response based on one or more parameters in the authorization configuration information; and forwarding the filtered response by the reverse proxy to a client device that submitted the request.

20. The non-transitory computer-readable medium of claim 19, wherein the request is an HTTP (hypertext transfer protocol) request and the response is a JSON (JavaScript Object Notation) object or an XML (Extensible Markup Language) document.

* * * * *